(12) United States Patent
Watanabe et al.

(10) Patent No.: US 10,787,980 B2
(45) Date of Patent: Sep. 29, 2020

(54) FUEL CONTROL DEVICE FOR ENGINE

(71) Applicant: Mazda Motor Corporation, Aki-gun, Hiroshima (JP)

(72) Inventors: Satoshi Watanabe, Higashihiroshima (JP); Takafumi Nishio, Otake (JP); Kazuhiro Nishimura, Higashihiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 16/343,186

(22) PCT Filed: Oct. 5, 2017

(86) PCT No.: PCT/JP2017/036271
§ 371 (c)(1),
(2) Date: Apr. 18, 2019

(87) PCT Pub. No.: WO2018/074244
PCT Pub. Date: Apr. 26, 2018

(65) Prior Publication Data
US 2019/0242315 A1    Aug. 8, 2019

(30) Foreign Application Priority Data
Oct. 21, 2016  (JP) .................................. 2016-206624

(51) Int. Cl.
*F02D 41/00* (2006.01)
*F02D 41/04* (2006.01)
(Continued)

(52) U.S. Cl.
CPC ......... *F02D 41/04* (2013.01); *F02D 41/0032* (2013.01); *F02D 41/0042* (2013.01);
(Continued)

(58) Field of Classification Search
CPC .............. F02D 41/0032; F02D 41/004; F02D 41/0042; F02D 41/0045; F02D 41/3029;
(Continued)

(56) References Cited

U.S. PATENT DOCUMENTS 5,438,967 A * 8/1995 Ito .......................... F02B 23/104
                                                    123/339.12
6,363,908 B1    4/2002 Kerns
(Continued)

FOREIGN PATENT DOCUMENTS

| JP | 2004156626 A | 6/2004 |
| JP | 3846481 B2 | 11/2006 |

(Continued)

OTHER PUBLICATIONS

European Patent Office, Extended European Search Report Issued in Application No. 17862111.6, dated Aug. 30, 2019, Germany, 8 pages.

*Primary Examiner* — Erick R Solis
(74) *Attorney, Agent, or Firm* — Alleman Hall Creasman & Tuttle LLP

(57) ABSTRACT

In a predetermined operating region, a fuel injection valve executes a second injection to inject fuel into a cylinder in a compression stroke, and a first injection to inject fuel into the cylinder 2 in the compression stroke or an intake stroke before the second injection. When a purge is executed, the total quantity of fuel to be injected by the fuel injection valve into the cylinder is reduced more than when the purge is not executed, and a fuel reduction quantity of the second injection is made smaller than a fuel reduction quantity of the first injection.

5 Claims, 7 Drawing Sheets

(51) Int. Cl.
  *F02D 41/34* (2006.01)
  *F02M 25/08* (2006.01)
  *F02D 41/30* (2006.01)
  *F02D 41/40* (2006.01)

(52) U.S. Cl.
  CPC ....... *F02D 41/0045* (2013.01); *F02D 41/047* (2013.01); *F02D 41/3029* (2013.01); *F02D 41/34* (2013.01); *F02D 41/402* (2013.01); *F02M 25/08* (2013.01); F02D 2041/0015 (2013.01)

(58) Field of Classification Search
  CPC .................. F02D 41/34; F02D 41/402; F02D 2041/0015; F02M 25/08
  USPC ................ 123/295, 299, 301, 518–521, 698
  See application file for complete search history.

(56) References Cited

U.S. PATENT DOCUMENTS

| | | | |
|---|---|---|---|
| 6,393,908 B1 | 5/2002 | Swain et al. | |
| 7,234,447 B2* | 6/2007 | Okubo | F02D 41/0042 123/431 |
| 2002/0029768 A1* | 3/2002 | Matsubara | F02D 41/0045 123/500 |
| 2003/0047161 A1* | 3/2003 | Bagnasco | F02D 41/0032 123/295 |
| 2007/0119410 A1* | 5/2007 | Leone | F02D 41/0002 123/295 |
| 2013/0151119 A1 | 6/2013 | Mariucci | |
| 2016/0281663 A1 | 9/2016 | Sasaki et al. | |

FOREIGN PATENT DOCUMENTS

| | | |
|---|---|---|
| JP | 2008045412 A | 2/2008 |
| JP | 2013209938 A | 10/2013 |
| JP | 2014202178 A | 10/2014 |
| WO | 2015162797 A1 | 10/2015 |

* cited by examiner

FUEL CONTROL DEVICE FOR ENGINE

TECHNICAL FIELD

The present invention relates to a fuel control device for an engine including an engine body in which a cylinder is formed, an intake passage for introducing intake air into the cylinder, a fuel tank for storing fuel, and a fuel injection valve for injecting the fuel into the engine body.

BACKGROUND ART

Conventionally, evaporated fuel generated in a fuel tank is introduced into an engine body through an intake passage and burned, thereby inhibiting the evaporated fuel from being released into the atmosphere.

Here, when the evaporated fuel is simply introduced into the engine body, this evaporated fuel is added to fuel injected from a fuel injection valve into the engine body, resulting in that engine torque becomes larger than a required value.

In contrast, Patent Literature 1 discloses an engine configured, when a purge for introducing the evaporated fuel in the fuel tank into the intake passage is executed, to reduce the injection quantity of the fuel injection valve for injecting fuel into a cylinder in accordance with a quantity of purge gas (gas introduced from the fuel tank side to the intake passage).

Also, Patent Literature 1 discloses a configuration, in order to increase the exhaust gas performance and fuel efficiency performance, to execute stratified charge combustion in an operating region where the number of engine revolutions is low and the engine torque is low, and a configuration, when the purge is executed while the stratified charge combustion is executed, to correct injection timing of the fuel injection valve, ignition timing.

As in Patent Literature 1, when the purge is executed, if a fuel quantity to be injected into the cylinder is reduced in accordance with a purge gas quantity, the total quantity of fuel to be supplied into the cylinder is maintained at an appropriate quantity. However, in a case of injecting fuel a plurality of separate times in the cylinder, a state in the cylinder changes depending on what kind of reduction is executed for each injection. Therefore, in this case, appropriate combustion may not be implemented.

Specifically, when stratified charge combustion is executed as in Patent Literature 1, fuel is injected into the cylinder in an intake stroke, and fuel is injected also in a compression stroke. The fuel injected in the compression stroke forms an air-fuel mixture with high fuel concentration around an ignition plug, implementing stratification of the air-fuel mixture. Therefore, if the quantity of fuel to be injected during the compression stroke is greatly reduced, stratification of the air-fuel mixture and stratified charge combustion may not be appropriately implemented.

CITATION LIST

Patent Literature

Patent Literature 1: Japanese Patent No. 3846481

SUMMARY OF INVENTION

The present invention has been made in view of the circumstances as described above, and it is an object of the present invention to provide a fuel control device for an engine capable of implementing more appropriate combustion in an engine in which a purge is executed.

To solve the above problem, one aspect of the present invention provides a fuel control device for an engine including an engine body in which a cylinder is formed, an intake passage for introducing intake air into the cylinder, a fuel tank for storing fuel, and a fuel injection valve for injecting the fuel into the engine body. The fuel control device includes: a purge execution unit configured to execute a purge to supply evaporated fuel in the fuel tank to the intake passage; and a fuel injection valve control unit configured to control the fuel injection valve. At least in a preset predetermined operating region, the fuel injection valve control unit causes the fuel injection valve to execute a second injection to inject the fuel into the cylinder in a compression stroke, and a first injection to inject the fuel into the cylinder in the compression stroke or an intake stroke before the second injection. When the purge is executed, the fuel injection valve control unit reduces a total quantity of the fuel to be injected into the cylinder by the fuel injection valve more than when the purge is not executed, and makes a fuel reduction quantity of the second injection smaller than a fuel reduction quantity of the first injection.

The fuel control device for an engine of the present invention can implement more appropriate combustion in the engine where the purge is executed.

DESCRIPTION OF EMBODIMENTS

(1) Overall Configuration of Engine

Figure 1:
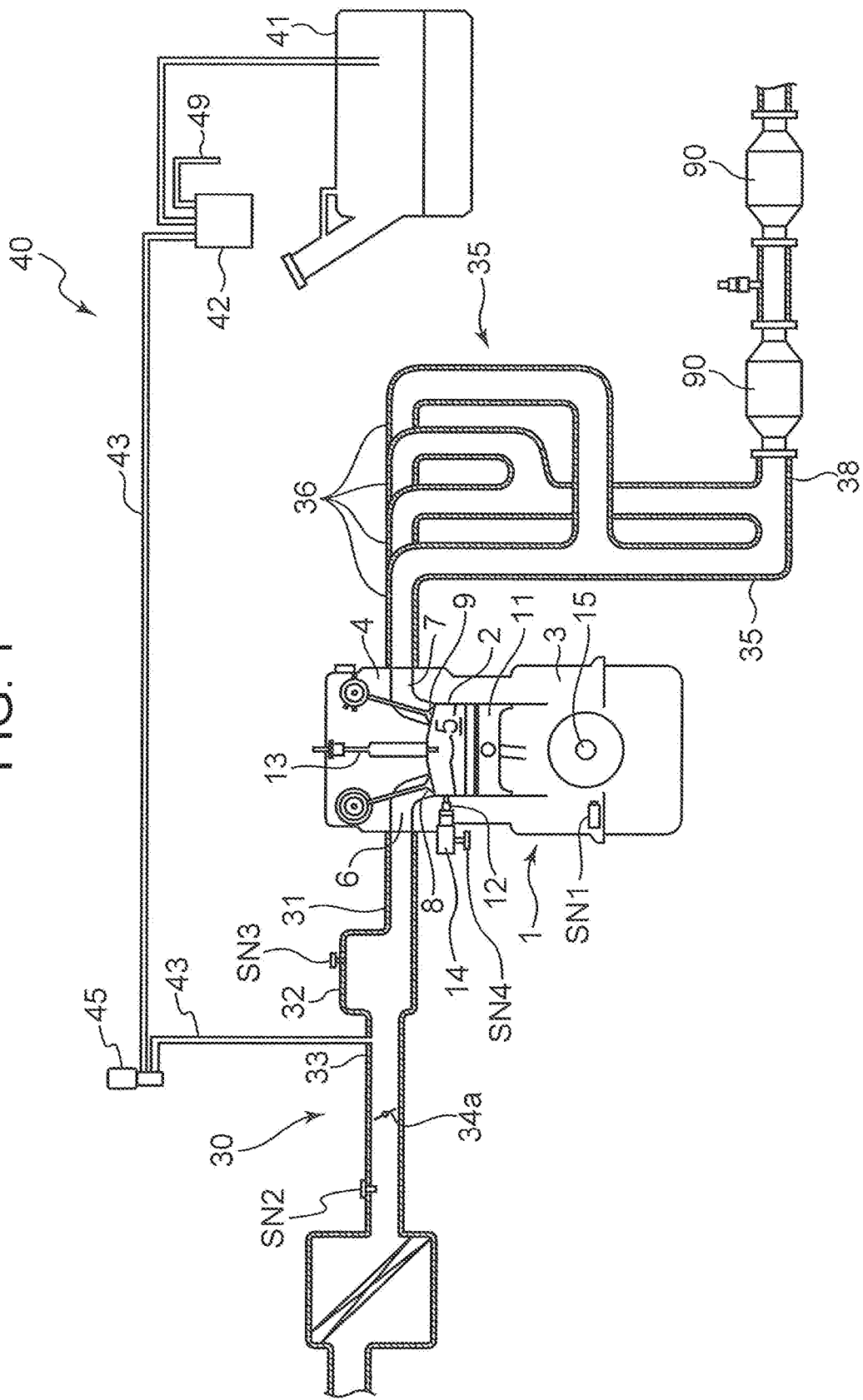
FIG. 1 is a schematic configuration diagram of an engine system to which a fuel control device for an engine according to an embodiment of the present invention is applied.

FIG. 1 is a diagram showing a configuration of an engine system to which a fuel control device for an engine according to one embodiment of the present invention is applied. The engine system of the present embodiment includes a four-stroke engine body 1, an intake passage 30 for introducing combustion air (intake air) into the engine body 1, an exhaust passage 35 for discharging exhaust gas from the engine body 1 to the outside, a fuel tank 41 for storing fuel, and a purge system (purge execution unit) 40 for introducing evaporated fuel generated in the fuel tank 41 into the engine body 1. This engine system is provided in a vehicle. The engine body 1 is used as a driving source for the vehicle. The engine body 1 is, for example, a four-cylinder engine including four cylinders 2 aligned in a direction orthogonal to the drawing of FIG. 1. The engine body 1 is a gasoline engine mainly using gasoline as fuel.

The engine body 1 includes a cylinder block 3 in which the cylinders 2 are formed, a cylinder head 4 provided on an upper surface of the cylinder block 3, and pistons 11 inserted into the cylinders 2 in a reciprocatingly slidable manner. Combustion chambers 5 are formed above the pistons 11 in the engine body 1. The pistons 11 are connected to a crankshaft 15 via connecting rods. The crankshaft 15 rotates around a central axis of the crankshaft 15 in accordance with reciprocating motion of the pistons 11.

The cylinder head 4 is provided with one injector (fuel injection valve) 12 in each cylinder 2 for injecting fuel into the combustion chamber 5 of the cylinder 2. The cylinder head 4 is provided with one ignition plug 13 in each cylinder 2 for igniting, by a spark discharge, a mixture of fuel and air injected from the injector 12.

In the present embodiment, the injector 12 has, at a tip, a plurality of nozzle holes that serves as nozzle ports for fuel. The injector 12 is provided to face the combustion chamber 5 of each cylinder 2 from a side of the intake side (left side in a left-right direction in FIG. 1). Also, the injector 12 can execute a plurality of injections per combustion cycle. Fuel is supplied from the fuel tank 41 to the injector 12 via piping (not shown) and a fuel rail 14.

The ignition plug 13 includes an electrode for discharging a spark at a tip. Each ignition plug 13 is provided to face the combustion chamber 5 of each cylinder 2 from above.

The cylinder head 4 is provided with intake ports 6 for introducing air supplied from the intake passage 30 into the combustion chamber 5 of each cylinder 2, intake valves 8 that opens and closes each intake port 6, exhaust ports 7 for deriving the exhaust gas generated in the combustion chamber 5 of each cylinder 2 to the exhaust passage 35, and exhaust valves 9 that opens and closes each exhaust port 7. Here, as shown in FIG. 1, the intake port 6 extends upward from a ceiling surface of the combustion chamber 5. Accordingly, the intake air flows downward from the intake port 6 into the combustion chamber 5 (in a reciprocating direction of the piston 11). Thus, in the present embodiment, a tumble flow is formed in the combustion chamber 5 (cylinder 2). In this way, in the present embodiment, the intake port 6 functions as a tumble flow generation unit.

The intake passage 30 includes a single intake pipe 33, a surge tank 32 with a predetermined volume, and a plurality of (four) independent intake passages 31 that individually connects between the surge tank 32 and the intake port 6 of each cylinder 2 (independent intake passages 31 are aligned in a direction orthogonal to the drawing of FIG. 1).

A throttle valve 34a (34) capable of opening and closing the passage of the intake pipe 33 is provided in a portion of the intake pipe 33 on an upstream side of the surge tank 32.

The exhaust passage 35 includes four independent exhaust passages 36 each communicating with the exhaust port 7 of each cylinder 2, and one exhaust pipe 38. The exhaust pipe 38 extends downstream from a portion where downstream ends of the independent exhaust passages 36 gather at one place. In the present embodiment, the independent exhaust passages 36 of two cylinders 2 in which exhaust sequence (sequence in which the exhaust stroke is executed) is not continuous gather in one passage. The independent exhaust passages 36 of two cylinders 2 in which exhaust sequence is not continuous gather in one passage. Two passages after gathering are converged in the exhaust pipe 38. The exhaust pipe 38 is provided with a catalyst device 90 having a built-in catalyst such as a three-way catalyst.

A purge system 40 includes a canister 42 that removably adsorbs the evaporated fuel evaporated in the fuel tank 41, a purge air pipe 49 that introduces air into the canister 42, and a purge pipe (purge passage) 43 that connects between the canister 42 and the intake pipe 33. The purge pipe 43 is connected to a portion of the intake pipe 33 between the throttle valve 34a and the surge tank 32.

The evaporated fuel adsorbed by the canister 42 is separated from the canister 42 when the air introduced from the purge air pipe 49 is supplied to the canister 42. The evaporated fuel separated from the canister 42 is introduced into the intake pipe 33 through the purge pipe 43 together with air. Hereinafter, a gas including the evaporated fuel and air flowing through the purge pipe 43 is referred to as a purge gas. The evaporated fuel contained in this purge gas is referred to as a purge fuel.

A purge valve 45 for opening and closing the purge pipe 43 is provided in the purge pipe 43. The purge valve 45 is a duty control valve and repeats opening and closing. Opening of the purge valve 45 is changed by changing a duty ratio, which is a ratio of a valve opening period to a unit period obtained by adding one valve opening period to a valve closing period. Hereinafter, opening the purge valve 45 to introduce the purge gas into the intake pipe 33 and eventually into each cylinder 2 is referred to as executing a purge.

(2) Control System

Figure 2:
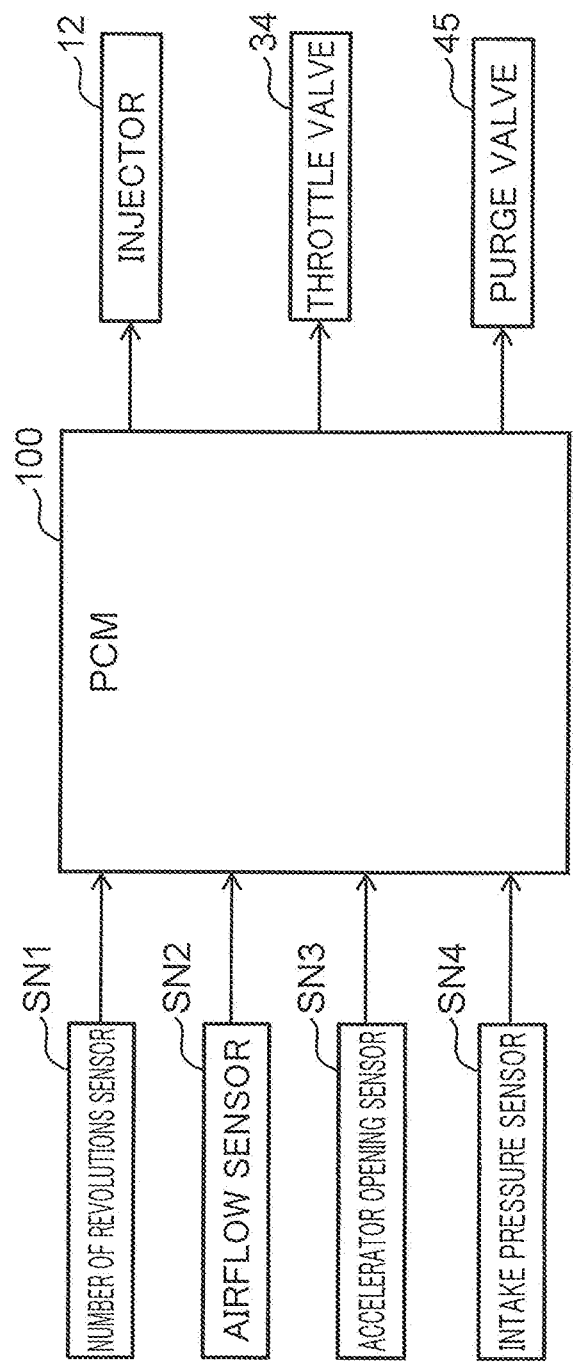
FIG. 2 is a block diagram showing a control system of the engine system.

A control system of the engine system will be described with reference to FIG. 2. The engine system of the present embodiment is controlled by a PCM (power train control module, fuel injection valve control unit) 100 mounted in the vehicle. The PCM 100 is a microprocessor including a CPU, a ROM, a RAM, an I/F, and other components.

The PCM 100 is electrically connected to a number of revolutions sensor SN1 for detecting a number of engine revolutions, an airflow sensor SN2 for detecting air introduced into the engine body 1, an accelerator opening sensor SN3 for detecting opening of an accelerator pedal (not shown) operated by a driver, an intake pressure sensor SN4 for detecting intake pressure, which is pressure inside the intake pipe 33, and other components. The PCM 100 executes various calculations based on input signals from the sensors (SN1 to SN4 and the like). The PCM 100 outputs command signals to and controls the injector 12, the ignition plug 13, the throttle valve 34, and the purge valve 45.

Next, control of the injector 12 by the PCM 100 will be described.

Figure 3:
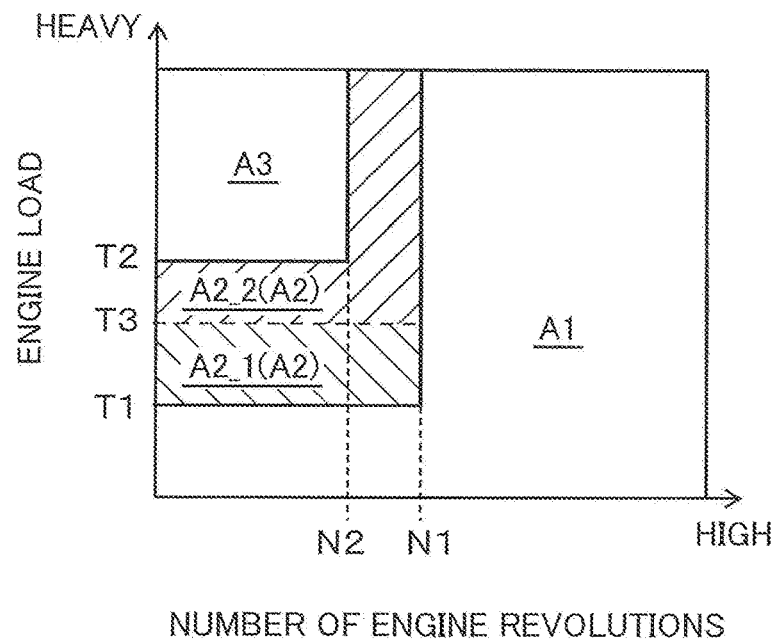
FIG. 3 is a diagram showing regions for injection patterns.

FIG. 3 is a diagram showing operating regions for injection patterns. In the present embodiment, the injection patterns of the injector 12 differ depending on the operating regions. In detail, the number of injections (the number of injections per combustion cycle) and injection timing differ depending on the operating regions.

In a third region A3 where the number of engine revolutions is equal to or lower than a preset second reference number of revolutions N2 and an engine load is equal to or heavier than a preset second reference load T2, three-split injection is executed (fuel is injected from the injector 12 three separate times per combustion cycle). In this third region A3, as shown in FIG. 4(d), a first pre-injection Q1_A and a first post-injection Q1_B are executed in this order in an intake stroke, and a second injection Q2 is executed in a compression stroke.

In a second region A2 (excluding the third region A3) where the engine load is equal to or heavier than a first reference load T1 out of a low number of revolutions region where the number of engine revolutions is equal to or lower than a preset first reference number of revolutions (reference number of revolutions) N1, two-split injection is executed (fuel is injected from the injector 12 two separate times per combustion cycle).

Figure 4:
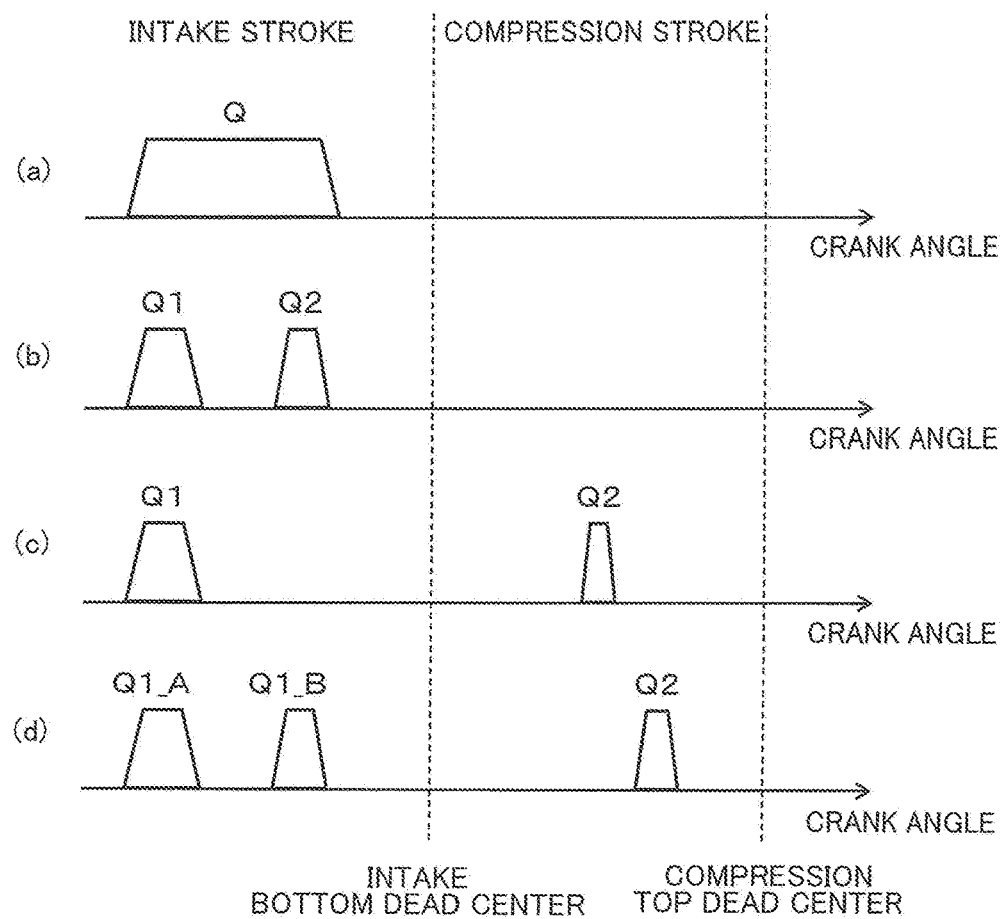
FIG. 4 is a diagram showing the injection patterns in respective regions, (a) is a diagram in a first region, (b) is a diagram in a second low-load side region, (c) is a diagram in a second high-load side region, and (d) is a diagram in a third region.

In detail, out of the second region A2, in a second high-load side region A2_2 where the engine load is equal to or heavier than a third reference load T3, as shown in FIG. 4(c), a first injection Q1 is executed in the intake stroke, and the second injection Q2 is executed in the compression stroke. Out of the second region A2, in a second low-load side region A2_1 where the engine load is lighter than the third reference load T3, as shown in FIG. 4(b), two injections (Q1, Q2) are executed in the intake stroke.

In the other first region A1, as shown in FIG. 4(a), a batch injection is executed and fuel is injected from the injector 12 only once per combustion cycle.

In this manner, in the third region A3 and the second high-load side region A2_2, split injection is executed and the last injection is executed in the compression stroke in order to increase fuel efficiency performance by executing stratified charge combustion in these regions A3 and A2_2. That is, the fuel injected into the cylinder 2 in the intake stroke is diffused to almost the entire cylinder 2 at timing near the compression top dead center and before the start of combustion. Meanwhile, the fuel injected during the compression stroke, particularly at timing near the compression top dead center is not sufficiently diffused until the start of combustion. Therefore, if the injection is executed as described above, it is possible to form an air-fuel mixture with high fuel concentration near the ignition plug 13 and to stratify the air-fuel mixture in the cylinder 2. Also, by igniting the air-fuel mixture with high fuel concentration, the ignitability and combustion speed of the air-fuel mixture can be increased, the ignition timing can be advanced, and the fuel efficiency performance can be increased.

Here, split injection may be executed in all the operating regions, but as the number of engine revolutions increases, the injector 12 needs to be driven a plurality of times in a short time, and the temperature rise of a circuit for driving the injector 12 becomes large, which is not preferable. Therefore, in the present embodiment, as described above, split injection is executed only in the regions where the number of engine revolutions is equal to or lower than the first reference number of revolutions N1. Meanwhile, when the engine load is light, the total quantity of fuel to be injected into the cylinder 2 decreases. Therefore, when split injection is executed in a region where the engine load is light, there is a possibility that the injection quantity per injection becomes very small and an appropriate quantity of fuel cannot be injected from the injector 12. Therefore, in the present embodiment, as described above, split injection is executed only in the regions where the engine load is equal to or heavier than the first reference load T1.

Figure 5:
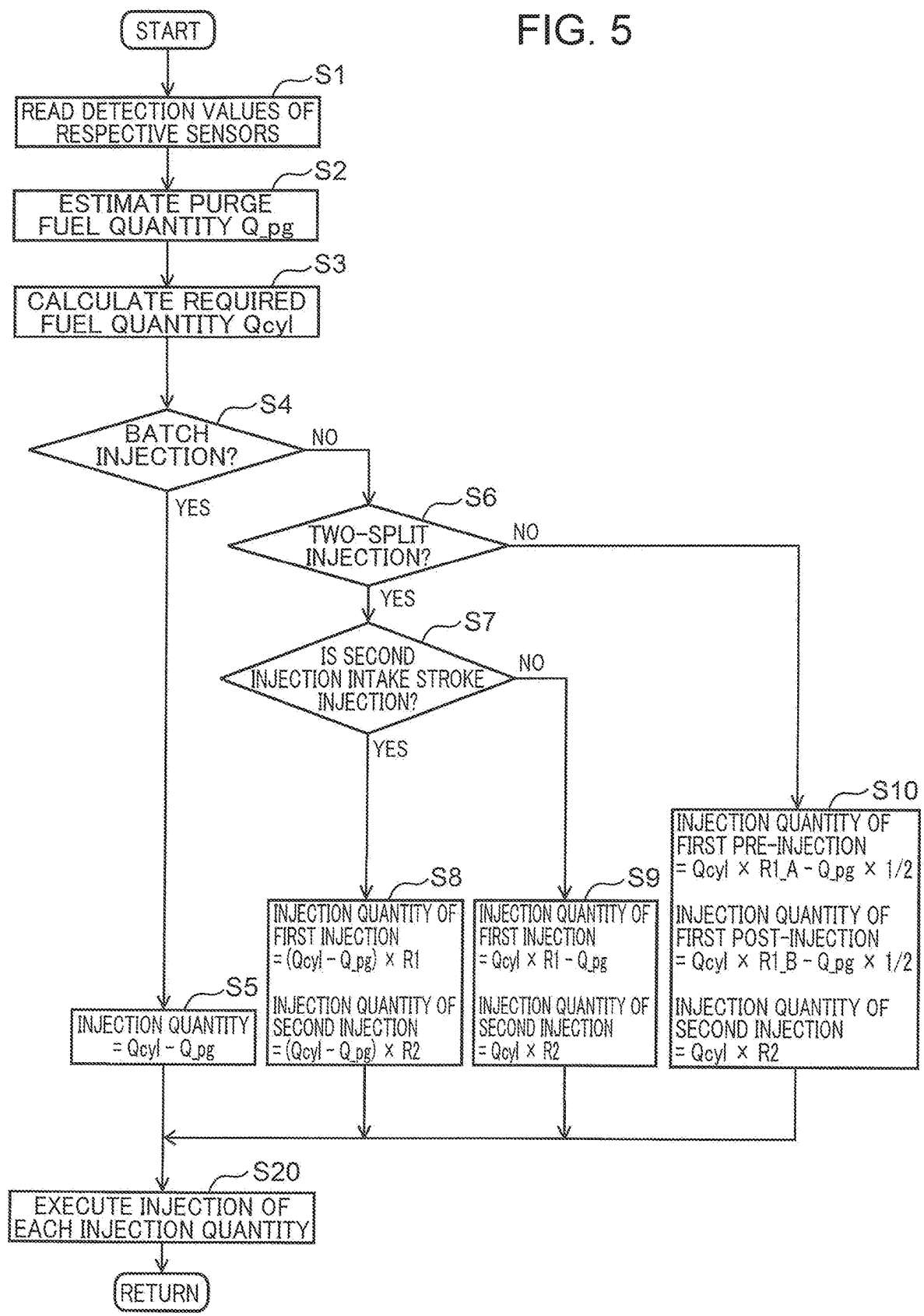
FIG. 5 is a flowchart showing a control procedure of an injector.

Next, a procedure of calculating the injection quantity will be described with reference to a flowchart of FIG. 5.

First, in step S1, the PCM 100 reads detection values of the sensors SN1 to SN4 and the like.

Next, in step S2, the PCM 100 estimates a quantity of purge fuel Q_pg introduced into the cylinder 2 (hereinafter simply referred to as a purge fuel quantity). In the present embodiment, differential pressure between before and after the purge valve 45 is calculated based on the atmospheric pressure and a value detected by the intake pressure sensor SN4. Based on the calculated differential pressure between before and after the purge valve 45 and the opening of the purge valve 45, a flow rate of the purge gas introduced into the cylinder 2 is estimated. Then, the purge fuel quantity Q_pg is estimated from the flow rate of the purge gas and separately estimated fuel concentration of the purge gas. Here, when the purge valve 45 is fully closed and the purge is not executed, the purge fuel quantity Q_pg is set at 0.

Next, in step S3, the PCM 100 calculates a required injection quantity (required fuel quantity) Qcyl based on an operating state of the engine body 1. The required injection quantity Qcyl is the total quantity of fuel to be supplied to the engine body 1 (in detail, to be supplied to each cylinder 2). The PCM 100 calculates required torque, which is the torque required for the engine body 1 based on the accelerator opening, the vehicle speed, and the like. The PCM 100 calculates charging efficiency of the cylinder 2 needed to implement the required torque, and calculates the required injection quantity Qcyl based on the calculated charging efficiency, the number of engine revolutions, and the like.

Next, in step S4, the PCM 100 determines whether to execute batch injection, that is, whether the current operating region is the first region A1.

If the determination in step S4 is YES, the process proceeds to step S5. In step S5, the PCM 100 sets the injection quantity of the injector 12 at a quantity obtained by subtracting the purge fuel quantity Q_pg from the required injection quantity Qcyl. After step S5, the process proceeds to step S20. In step S20, the PCM 100 causes the injector 12 to inject the fuel of the injection quantity set in step S5.

On the other hand, if the determination in step S4 is NO, the process proceeds to step S6. In step S6, the PCM 100 determines whether to execute two-split injection, that is, whether the current operating region is the second region A2.

If the determination in step S6 is YES, the process proceeds to step S7. In step S7, the PCM 100 further determines whether the second injection Q2 is intake stroke injection (whether the second injection Q2 is to be executed in the intake stroke), that is, whether the current operating region is the second low-load side region A2_1.

If the determination in step S7 is YES and two-split injection is executed and both injections are executed in the intake stroke, the process proceeds to step S8. In step S8, the PCM 100 sets the injection quantity of the first injection Q1 at a value obtained by multiplying a value obtained by subtracting the purge fuel quantity Q_pg from the required injection quantity Qcyl by a split ratio R1 of the first injection. Also, the PCM 100 sets the injection quantity of the second injection Q2 at a quantity obtained by multiplying the value obtained by subtracting the purge fuel quantity Q_pg from the required injection quantity Qcyl by a split ratio R2 of the second injection.

Here, the split ratio is a ratio of the injection quantity of each injection to the total injection quantity when split injection is executed (the total quantity of fuel to be supplied into the cylinder 2 during one combustion cycle). The split ratio is set in advance in accordance with the number of engine revolutions, the engine load, and the like.

As described above, when two-split injection is executed and both injections are executed in the intake stroke, the injection quantity of each injection Q1, Q2 is set at a quantity obtained by multiplying the quantity obtained by subtracting the purge fuel quantity Q_pg from the required injection quantity Qcyl by each split ratio. Accordingly, the total quantity of the injection quantity of the injector 12 is set at the quantity obtained by subtracting the purge fuel quantity Q_pg from the required injection quantity Qcyl. After step S8, the process proceeds to step S20.

On the other hand, if the determination in step S7 is NO and the second injection Q2 out of the two-split injection is executed in the compression stroke, the process proceeds to step S9.

In step S9, the PCM 100 sets the injection quantity of the first injection Q1 at a quantity obtained by subtracting the purge fuel quantity Q_pg from a value obtained by multiplying the required injection quantity Qcyl by the split ratio R1 of the first injection Q1. Meanwhile, the injection quantity of the second injection Q2 is set at a value obtained by multiplying the required injection quantity Qcyl by the split ratio R2 of the second injection Q2.

In this way, when two-split injection is executed and the second injection Q2 is executed in the compression stroke, the injection quantity of the second injection Q2 is maintained at a value obtained by multiplying the required injection quantity Qcyl by the split ratio R2 of the second injection Q2, that is, the injection quantity of the second injection Q2 when the purge is not executed. Then, only the injection quantity of the first injection Q1 is reduced, and the injection quantity of the first injection Q1 is set at a quantity obtained by subtracting the purge fuel quantity Q_pg from a value obtained by multiplying the required injection quantity Qcyl by the split ratio R1 of the first injection Q1 (value equal to the injection quantity of the first injection Q1 when the purge is not executed). Then, the total quantity of the injection quantity of the injector 12 is set at the quantity obtained by subtracting the purge fuel quantity Q_pg from the required injection quantity Qcyl. After step S9, the process proceeds to step S20.

Returning to step S6, when the determination in step S6 is NO and neither batch injection nor two-split injection is executed, that is, when three-split injection is executed (the current operating region is the third region A3), the process proceeds to step S10.

In step S10, the PCM 100 sets the injection quantity of the first pre-injection Q1_A at a quantity obtained by subtracting half of the purge fuel quantity Q_pg from a value obtained by multiplying the required injection quantity Qcyl by the split ratio R1_A of the first pre-injection Q1_A. Also, the PCM 100 sets the injection quantity of the first post-injection Q1_B at a quantity obtained by subtracting half of the purge fuel quantity Q_pg from a value obtained by multiplying the required injection quantity Qcyl by the split ratio R1_B of the first post-injection Q1_B. Also, the PCM 100 sets the injection quantity of the second injection Q2 at a value obtained by multiplying the required injection quantity Qcyl by the split ratio R2 of the second injection Q2.

In this way, when three-split injection is executed to execute two injections in the intake stroke and execute one injection in the compression stroke, the injection quantity of the first pre-injection Q1_A to be executed in the intake stroke is set at a quantity obtained by subtracting half of the purge fuel quantity Q_pg from a value obtained by multiplying the required injection quantity Qcyl by the split ratio R1_A of the first pre-injection Q1_A (value equal to the injection quantity of the first pre-injection Q1_A when the purge is not executed). Similarly, the injection quantity of the first post-injection Q1_B to be executed in the intake stroke is set at a quantity obtained by subtracting half of the purge fuel quantity Q_pg from a value obtained by multiplying the required injection quantity Qcyl by the split ratio R1_B of the first post-injection Q1_B (value equal to the injection quantity of the first post-injection Q1_B when the purge is not executed). Meanwhile, the injection quantity of the second injection Q2 to be executed in the compression stroke is not reduced, and the injection quantity of the second injection Q2 is maintained at the injection quantity of the second injection Q2 when the purge is not executed. Then, the total quantity of the injection quantity of the injector 12 is set at the quantity obtained by subtracting the purge fuel quantity Q_pg from the required injection quantity Qcyl. After step S10, the process proceeds to step S20.

(3) Effects and the Like

As described above, in the present embodiment, when the purge is executed, the total quantity of the injection quantity of the injector 12 is set at the quantity obtained by subtracting the purge fuel quantity Q_pg from the required injection quantity Qcyl, regardless of the number of injections. Therefore, while the purge is executed and the evaporated fuel in the fuel tank 41 is burned in the cylinder 2, the total fuel quantity to be supplied to the cylinder 2 can be maintained at the required injection quantity Qcyl. Therefore, the torque of the engine body 1 can be set at the required torque.

Also, in the second high-load side region A2_2 and the third region A3, the fuel is injected into the cylinder 2 in two times in the intake stroke and the compression stroke, and stratified charge combustion is executed, thereby increasing the fuel efficiency performance.

Moreover, when the purge is executed while stratified charge combustion is executed (during operations in the second high-load side region A2_2 and the third region A3), in both the two-split injection and the three-split injection, the injection quantity of the second injection Q2 that is the last injection and is executed in the compression stroke is maintained at the same quantity as when the purge is not executed. Then, from the injection quantity of other injections except for the second injection Q2, the quantity equivalent to the purge fuel quantity supplied to the cylinder 2 is reduced. Therefore, it is possible to form the air-fuel mixture with high fuel concentration in the cylinder 2 by the second injection Q2, to stratify the air-fuel mixture, and to implement more appropriate stratified charge combustion.

In particular, in the present embodiment, in the third region A3 where two injections are executed in the intake stroke and one injection is executed in the compression stroke, when the purge is executed, both the first pre-injection Q1_A and the first post-injection Q1_B to be executed in the intake stroke are reduced. Therefore, it is possible to inhibit soot from increasing while maintaining appropriate stratification of the air-fuel mixture.

This will be specifically described with reference to FIGS. 6 to 10.

Figure 6:
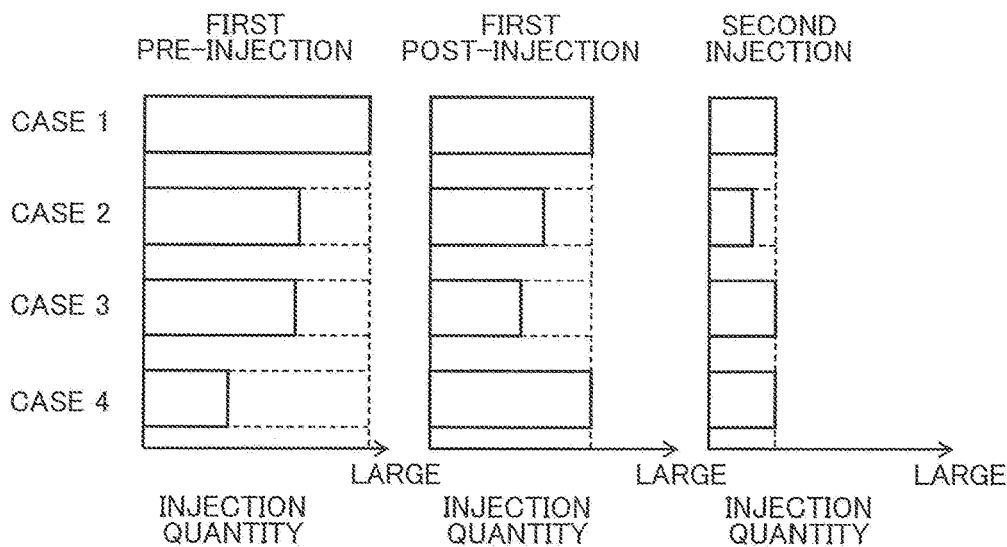
FIG. 6 is a diagram schematically showing each injection quantity in each case.

The inventors of the present invention have made the method of reducing the injection quantity different in cases 2, 3, and 4 shown in FIG. 6 when the purge is executed during execution of three-split injection, and examined the degree of stratification and the fuel quantity adhering to a wall surface in these cases.

FIG. 6 is a diagram schematically showing the injection quantity of each injection in each case (first pre-injection Q1_A, first post-injection Q1_B, and second injection Q2). Case 1 in FIG. 6 is a case where the purge is not executed. Case 2 is a case where the quantities obtained by subtracting the quantities obtained by multiplying the purge fuel quantity Q_pg by the split ratios R1_A, R1_B, and R2 from the injection quantities in case 1 are set as the injection quantities of the injections Q1_A, Q1_B, and Q2, respectively. Case 3 is an injection pattern according to the present embodiment, and is a case where the second injection Q2 is not reduced, and the injection quantity of the first pre-injection Q1_A and the injection quantity of the first post-injection Q1_B are reduced by the same quantity (half of the purge fuel quantity Q_pg). Case 4 is a case where only the first pre-injection Q1_A is reduced. In detail, in case 4, the injection quantity of the first pre-injection Q1_A is set at the quantity obtained by subtracting the purge fuel quantity Q_pg from the injection quantity of case 1.

Figure 7:
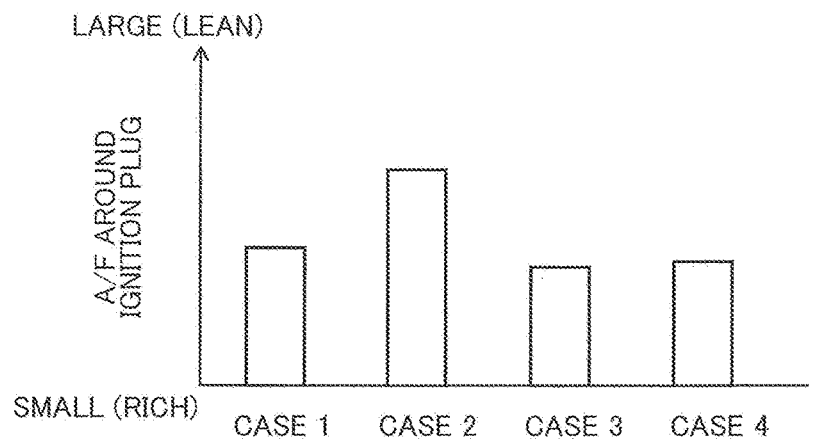
FIG. 7 is a diagram showing an air-fuel ratio around an ignition plug in each case.
Figure 8:
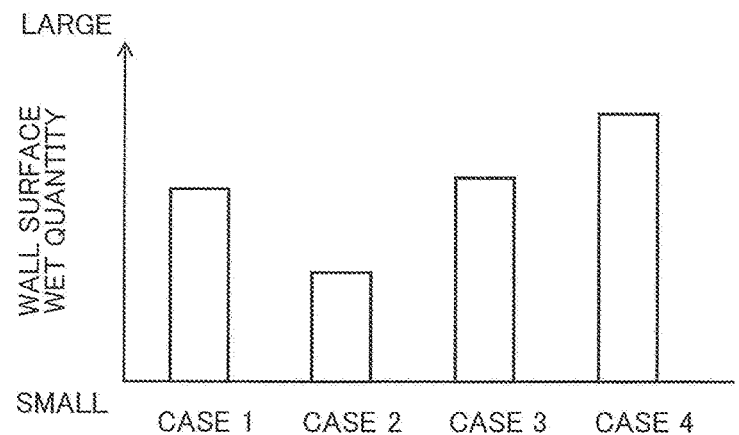
FIG. 8 is a diagram showing a wall surface wet quantity in each case.

FIG. 7 is a diagram showing a result of calculating an air-fuel ratio (A/F) of the air-fuel mixture around the ignition plug 13 at the compression top dead center for cases 1 to 4 by computational fluid dynamics (CFD) analysis. FIG. 8 is a diagram showing a result of calculating a wall surface wet quantity, that is, the quantity of fuel adhering to the wall surface of the cylinder 2 for cases 1 to 4 by CFD analysis.

As shown in FIG. 7, in case 2, the A/F around the ignition plug 13 is larger (leaner) than in other cases. Meanwhile, in case 3 and case 4, the A/F around the ignition plug 13 is maintained at about the same level as in case 1. This result indicates that, as described above, the air-fuel mixture is stratified more appropriately when the injection quantity of the second injection Q2 is not reduced.

However, as is apparent from a comparison between case 2, and case 3 or case 4 in FIG. 8, when the reduction quantity of the injection quantity of the first pre-injection Q1_A and the injection quantity of the first post-injection Q1_B is increased, the wall surface wet quantity increases. As is apparent from a comparison between case 3 and case 4, in case 4 where the reduction quantity of the first pre-injection Q1_A is larger, the wall surface wet quantity becomes larger than in case 3 where the reduction quantity of the first pre-injection Q1_A is smaller. This is considered because momentum of the tumble flow generated in the cylinder 2 when the first post-injection Q1_B is executed is weakened due to the small first pre-injection Q1_A, resulting in that the fuel related to the first post-injection Q1_B easily scatters farther. This will be described in detail with reference to FIGS. 9A to 9E and 10A to 10E.

Figure 9A:
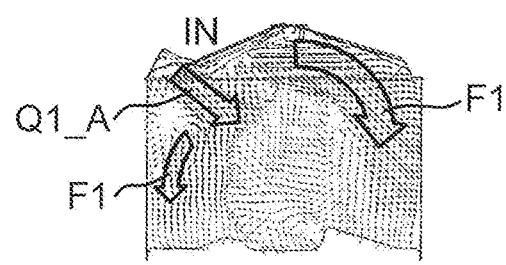
FIGS. 9A to 9E are diagrams showing a gas flow in a cylinder when a first pre-injection is executed, and at each time.
Figure 9B:
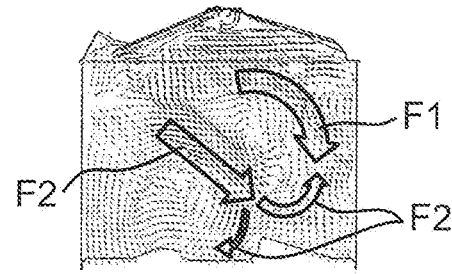
Figure 9C:
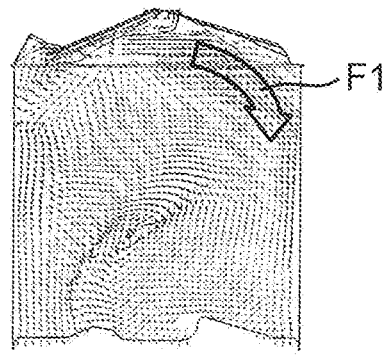
Figure 9D:
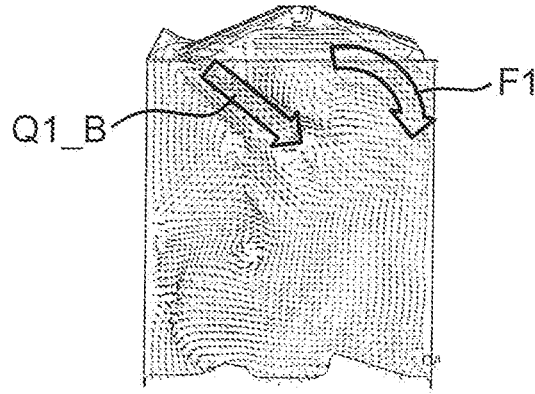
Figure 9E:
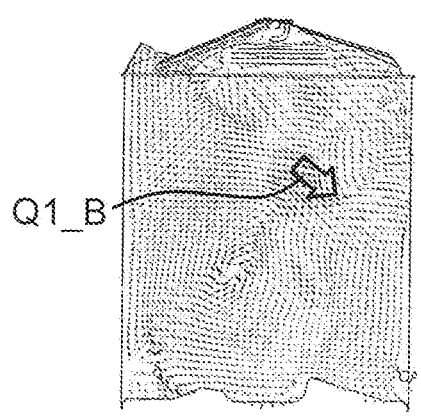
Figure 10A:
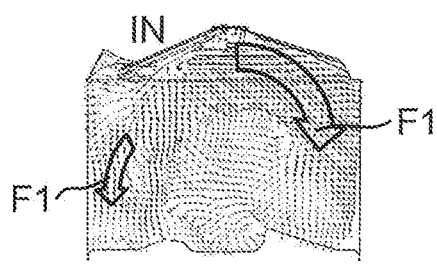
FIGS. 10A to 10E are diagrams showing the gas flow in the cylinder when the first pre-injection is not executed, and at each time.
Figure 10B:
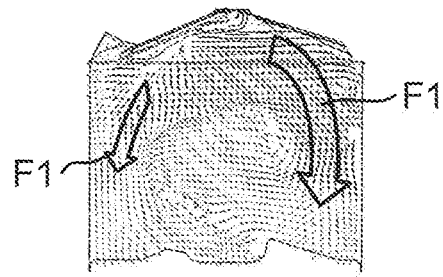
Figure 10C:
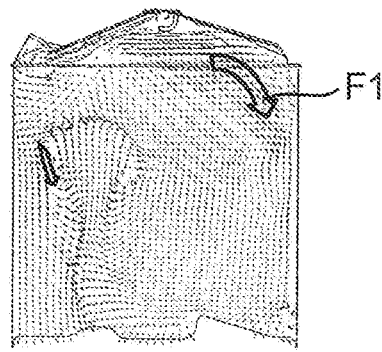
Figure 10D:
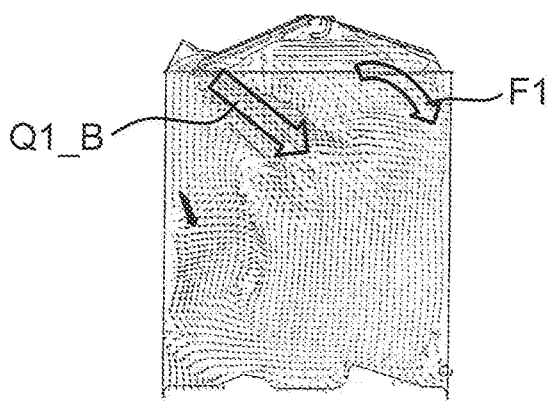
Figure 10E:
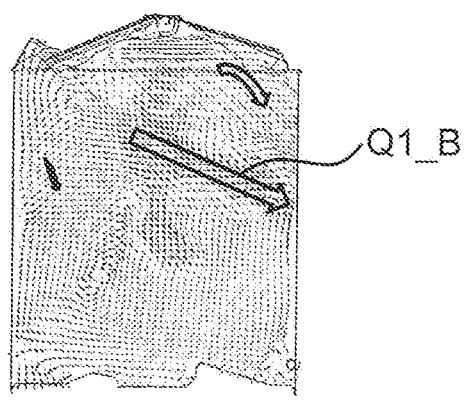

FIGS. 9A to 9E and 10A to 10E are diagrams showing a gas flow inside the cylinder 2 in the intake stroke. FIGS. 9A to 9E (a) to (e) and FIGS. 10A to 10E each show the gas flow at different time. Specifically, time elapses in order from FIGS. 9A to 9E and FIGS. 10A to 10E. FIGS. 9A and 10A each show the gas flow at the timing when the first pre-injection Q1_A is executed. FIGS. 9D and 10D each show the gas flow at the timing when the first post-injection Q1_B is executed. Also, FIGS. 9A to 9E are diagrams when injection is executed twice in the intake stroke. FIGS. 10A to 10E are diagrams obtained by omitting the injection to be executed at the earlier timing of the two injections of the intake stroke from the injection pattern in which the result of FIGS. 9A to 9E are obtained. In detail, FIGS. 9A and 10A, 9B and 10B, FIGS. 9C and 10C, FIGS. 9D and 10D, and FIGS. 9E and 10E are drawings of before top dead center (BTDC) 275° CA, BTDC 265° CA, BTDC 235° CA, BTDC 210° CA, and BTDC 205° CA, respectively.

As shown in FIGS. 9A and 10A, a tumble flow F1 is generated in the cylinder 2 in the intake stroke. Specifically, the gas flow F1 going downward along the wall surface of the cylinder 2 is generated from the intake valve 8 side ("IN" side in the left-right direction in FIGS. 9A to 9E and 10A to 10E).

As shown in FIG. 9B, when the first pre-injection Q1_A is executed while the tumble flow F1 is generated in this way, in an upper portion of the cylinder 2, the flow F2 formed by the first pre-injection Q1_A temporarily obstructs the tumble flow F1 going downward. Therefore, as shown in FIG. 9C, when the first pre-injection Q1_A is executed, the relatively strong tumble flow F1 remains in the upper portion of the cylinder 2 even after the first pre-injection Q1_A is finished. Therefore, when the first pre-injection Q1_A is executed, as shown in FIG. 9D, the first post-injection Q1_B is executed while the relatively strong tumble flow F1 remains. Accordingly, when the first pre-injection Q1_A is executed, scattering of the first post-injection Q1_B is inhibited by the strong tumble flow F1. As a result, as shown in FIG. 9E, adhesion of the fuel injected by the first post-injection Q1_B to the wall surface of the cylinder 2 is inhibited.

Meanwhile, as shown in FIGS. 10B and 10C, when the first pre-injection Q1_A is not executed, the tumble flow F1 is diffused to the entire cylinder 2 relatively early. As a result, momentum of the tumble flow F1 in the upper portion of the cylinder 2 weakens early. Therefore, when the first pre-injection Q1_A is not executed, as shown in FIG. 10D, the fuel injected by the first post-injection Q1_B scatters farther without being substantially obstructed by the tumble flow F1. As a result, when the first pre-injection Q1_A is not executed, more fuel adheres to the wall surface of the cylinder 2.

In this way, when the first pre-injection Q1_A is not executed or is small, the momentum of the tumble flow in the upper portion in the cylinder 2 becomes weak when the first post-injection Q1_B is executed, resulting in that the quantity of fuel injected by the first post-injection Q1_B and adhering to the wall surface of the cylinder 2 increases. Then, when the first pre-injection Q1_A is not executed or is small, as the quantity of fuel adhering to the wall surface of the cylinder 2 increases, the adhered fuel does not properly burn, increasing soot.

Therefore, as described above, in the third region A3, when both the first pre-injection Q1_A and the first post-injection Q1_B to be executed in the intake stroke are reduced, it is possible to secure more injection quantity of the first pre-injection Q1_A, to reduce the quantity of fuel adhering to the wall surface of the cylinder 2, inhibiting soot from increasing.

(4) Modification

The above-described embodiment has described a case where, during execution of stratified charge combustion (during the operations in the second high-load side region A2_2 and the third region A3), even when the purge is executed, the reduction quantity of the injection quantity of the second injection Q2 is set at 0, and the injection quantity of the second injection Q2 is not reduced. At this time, the injection quantity of the second injection Q2 may be reduced. In this case, however, the reduction quantity of the injection quantity of the second injection Q2 is set at a minute quantity smaller than the reduction quantity in the other injections Q1, Q1_A, or Q1_B.

Also, the above-described embodiment has described a case where, when three-split injection is executed (during the operation in the third region A3), when the purge is executed, the injection quantity of the first pre-injection Q1_A and the injection quantity of the first post-injection Q1_B are reduced by the same quantity. The reduction quantity of the first pre-injection Q1_A may be different from the reduction quantity of the first post-injection Q1_B. However, as in the above-described embodiment, when the reduction quantity of the first pre-injection Q1_A and the reduction quantity of the first post-injection Q1_B are set to be equal to each other, it is possible to inhibit the injection quantity of the first pre-injection Q1_A from becoming too small and to inhibit the fuel quantity adhering to the wall surface of the cylinder 2 from becoming large, and to simplify calculation of the reduction quantity.

Also, the above-described embodiment has described a case where, when three-split injection is executed (during the operation in the third region A3), the first post-injection Q1_B is executed in the intake stroke. The first post-injection Q1_B may be executed in the compression stroke.

Also, during execution of three-split injection (during the operation in the third region A3), that is, when two injections (first pre-injection Q1_A, first post-injection Q1_B) are executed in the intake stroke and one injection (second injection Q2) is executed in the compression stroke, and when the purge is executed, the injection quantity of the first pre-injection Q1_A may not be reduced, and only the injection quantity of the first post-injection Q1_B may be reduced. Even in this case, since the injection quantity of the first pre-injection Q1_A is ensured to be large, it is possible to inhibit the fuel from adhering to the wall surface of the cylinder 2. Also, in this case, since the injection quantity of the first post-injection Q1_B is controlled to be small, it is possible to more reliably inhibit the fuel injected by the first post-injection Q1_B from adhering to the wall surface of the cylinder 2.

However, when the execution timing of the first post-injection Q1_B is late, particularly in the compression stroke, the first post-injection Q1_B also affects the air-fuel mixture with high fuel concentration formed around the ignition plug 13. Therefore, in this case, in order to more reliably generate the air-fuel mixture with high fuel concentration, it is preferable to control the reduction quantity of the injection quantity of the first post-injection Q1_B to be small.

Note that the above-described specific embodiment mainly includes the invention having the following configurations.

One aspect of the present invention is a fuel control device for an engine including an engine body in which a cylinder is formed, an intake passage for introducing intake air into the cylinder, a fuel tank for storing fuel, and a fuel injection valve for injecting the fuel into the engine body. The fuel control device includes: a purge execution unit configured to execute a purge to supply evaporated fuel in the fuel tank to the intake passage; and a fuel injection valve control unit configured to control the fuel injection valve. At least in a preset predetermined operating region, the fuel injection valve control unit causes the fuel injection valve to execute a second injection to inject the fuel into the cylinder in a compression stroke, and a first injection to inject the fuel into the cylinder in the compression stroke or an intake stroke before the second injection. When the purge is executed, the fuel injection valve control unit reduces a total quantity of the fuel to be injected into the cylinder by the fuel injection valve more than when the purge is not executed, and makes a fuel reduction quantity of the second injection smaller than a fuel reduction quantity of the first injection.

With this configuration, at least in the predetermined operating region, the second injection is executed in the compression stroke and the first injection is executed before that, thereby stratifying the fuel in the cylinder, implementing stratified charge combustion, and increasing fuel efficiency performance. Also, when the purge is executed during execution of the stratified charge combustion, the total quantity of fuel to be injected by the fuel injection valve into the cylinder is reduced, thereby maintaining the fuel quantity in the cylinder and output torque of the engine body at appropriate values.

Moreover, with this configuration, when reducing the fuel quantity to be injected by the fuel injection valve, the reduction quantity of the second injection is set to be smaller than the reduction quantity of the first injection. Therefore, it is possible to secure the injection quantity of the second injection to be executed in the compression stroke (the fuel quantity to be injected into the cylinder) and to appropriately form the air-fuel mixture with high fuel concentration in the cylinder, that is, to stratify the air-fuel mixture appropriately, and to implement more appropriate combustion.

In the above configuration, the fuel injection valve control unit preferably reduces a fuel quantity of only the first injection when the purge is executed.

This makes it possible to more reliably execute appropriate formation of the air-fuel mixture with high fuel concentration in the cylinder by the second injection to be executed in the compression stroke, and to implement appropriate combustion.

In the above configuration, preferably, the fuel injection valve is disposed to inject the fuel into the cylinder from a side surface of the cylinder, and the fuel injection valve control unit executes, as the first injection, a first pre-injection to inject the fuel into the cylinder in the intake stroke and a first post-injection to inject the fuel in the intake stroke and after the first pre-injection, and the fuel injection valve control unit reduces the fuel quantity of the first pre-injection and the first post-injection when the purge is executed.

This makes it possible to inhibit the injection quantity of the first pre-injection from becoming excessively small, and to more reliably diffuse the fuel into the cylinder by the first pre-injection.

The above configuration is effectively applied to the fuel control device including a tumble flow generation unit configured to generate a tumble flow in the cylinder.

The above configuration inhibits the injection quantity of the first pre-injection from becoming excessively small. Therefore, in the engine in which the fuel injection valve injects fuel into the cylinder from the side surface of the cylinder, it is possible to inhibit the tumble flow in the upper portion of the cylinder from becoming weaker by the first pre-injection and to inhibit the fuel injected by the first post-injection from adhering to the wall surface of the cylinder by this tumble flow, and to inhibit soot from increasing.

In the above configuration, the fuel injection valve control unit preferably reduces an identical quantity of the fuel of the first pre-injection and the first post-injection when the purge is executed.

This makes it possible to reduce the fuel quantity of the first pre-injection and the first post-injection with a relatively simple configuration. As a configuration different from the above configuration, the fuel injection valve may be disposed to inject the fuel into the cylinder from a side surface of the cylinder, and the fuel injection valve control unit may execute, as the first injection, a first pre-injection to inject the fuel into the cylinder in the intake stroke and a first post-injection to inject the fuel in the intake stroke and after the first pre-injection, and the fuel injection valve control unit may reduce the fuel quantity of the first post-injection but does not reduce the fuel quantity of the first pre-injection when the purge is executed.

This configuration also makes it possible to secure the injection quantity of the first pre-injection and to more reliably diffuse the fuel into the cylinder by the first pre-injection.

The above configuration is effectively applied to the fuel control device including a tumble flow generation unit configured to generate a tumble flow in the cylinder.

In the above configuration, the injection quantity of the first pre-injection is not reduced but is secured a lot. Therefore, this configuration also makes it possible to more reliably inhibit the first post-injection from adhering to the wall surface of the cylinder, and to inhibit soot from increasing.

In the above configuration, the fuel injection valve control unit may cause the fuel injection valve to execute the first injection and the second injection in at least part of a low number of revolutions region where a number of engine revolutions is equal to or lower than a preset reference number of revolutions.

The invention claimed is:

1. A fuel control device for an engine including an engine body in which a cylinder is formed, an intake passage for introducing intake air into the cylinder, a fuel tank for storing fuel, and a fuel injection valve for injecting the fuel into the engine body, the fuel control device comprising:
- a purge execution unit configured to execute a purge to supply evaporated fuel in the fuel tank to the intake passage; and
- a fuel injection valve control unit configured to control the fuel injection valve, wherein
- the fuel injection valve is disposed to inject the fuel into the cylinder from a side surface of the cylinder,
- at least in a preset predetermined operating region, the fuel injection valve control unit is configured to cause the fuel injection valve to execute a second injection to inject the fuel into the cylinder in a compression stroke, and a first injection to inject the fuel into the cylinder in an intake stroke, the first injection including a first pre-injection to inject the fuel into the cylinder in the intake stroke and a first post-injection to inject the fuel into the cylinder in the intake stroke and after the first pre-injection, characterized in that when the purge is executed, the fuel injection valve control unit is configured to reduce a total quantity of the fuel to be injected into the cylinder by the fuel injection valve more than when the purge is not executed by reducing a fuel quantity of the first post-injection without reducing a fuel quantity of the first pre-injection while making a fuel reduction quantity of the second injection smaller than a fuel reduction quantity of the first injection.

2. The fuel control device for an engine according to claim 1, wherein the fuel injection valve control unit reduces a fuel quantity of only the first injection when the purge is executed.

3. The fuel control device for an engine according to claim 1, further comprising a tumble flow generation unit configured to generate a tumble flow in the cylinder.

4. The fuel control device for an engine according to claim 1, wherein the fuel injection valve control unit causes the fuel injection valve to execute the first injection and the second injection in at least part of a low number of revolutions region where a number of engine revolutions is equal to or lower than a preset reference number of revolutions.

5. The fuel control device for an engine according to claim 1, wherein
the fuel injection valve control unit reduces only the fuel quantity of the first post-injection but does not reduce the fuel quantity of the first pre-injection and the second injection when the purge is executed.

* * * * *